(12) United States Patent
Gattani

(10) Patent No.: US 12,174,840 B2
(45) Date of Patent: Dec. 24, 2024

(54) OPTIMIZING THE RESPONSE TIME OF DATA PROFILING IN INTERACTIVE SESSIONS

(71) Applicant: Oracle International Corporation, Redwood Shores, CA (US)

(72) Inventor: Rohit Jaykumar Gattani, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 239 days.

(21) Appl. No.: 17/463,236

(22) Filed: Aug. 31, 2021

(65) Prior Publication Data

US 2023/0066530 A1 Mar. 2, 2023

(51) Int. Cl.
| | | |
|---|---|---|
| *G06F 16/2457* | (2019.01) | |
| *G06F 16/215* | (2019.01) | |
| *G06F 16/22* | (2019.01) | |
| *G06N 20/00* | (2019.01) | |

(52) U.S. Cl.
CPC ...... *G06F 16/24578* (2019.01); *G06F 16/215* (2019.01); *G06F 16/221* (2019.01); *G06N 20/00* (2019.01)

(58) Field of Classification Search
CPC ............. G06F 16/24578; G06F 16/221; G06F 16/215; G06N 20/00
See application file for complete search history.

(56) References Cited

U.S. PATENT DOCUMENTS

| | | | |
|---|---|---|---|
| 11,461,347 B1* | 10/2022 | Das ..................... | G06F 16/2433 |
| 2007/0265905 A1* | 11/2007 | Lazier ................ | G06Q 30/0201 |
| | | | 705/7.29 |
| 2010/0036805 A1* | 2/2010 | Blamer ............. | G06F 16/24539 |
| | | | 707/E17.014 |
| 2012/0150779 A1* | 6/2012 | Vaiciulis ................ | G06Q 40/00 |
| | | | 706/21 |
| 2016/0124728 A1* | 5/2016 | Mahaffey ............ | G06F 11/3466 |
| | | | 717/158 |
| 2018/0075104 A1* | 3/2018 | Oberbreckling ...... | G06F 16/254 |
| 2018/0075115 A1* | 3/2018 | Murray ................ | G06F 16/248 |

OTHER PUBLICATIONS

18 Performing Data Profiling, Oracle, 2000, 30 pages.
Data Profiles and Semantic Recommendations, Visualizing Data in Oracle Analytics Server, 3 pages.
Data Quality with EDQ—Part 1: Data Profiling, Data Quality With EDQ, Feb. 16, 2021, 14 pages.
TESTUT, Comprehensive Data Quality With Oracle Data Integrator and Oracle Enterprise Data Quality, Oracle, Jan. 2013, 11 pages.

* cited by examiner

*Primary Examiner* — Jensen Hu
(74) *Attorney, Agent, or Firm* — Kilpatrick Townsend & Stockton LLP

(57) ABSTRACT

Techniques for providing intelligent data profiling services are disclosed. A distributed computing system can include a data profiling service and a data recommender service. During an interactive data session, a user can select a data column of a data entity and request data profiling information for the data column. The data profiling service can compute the requested profile. The data recommender service can then determine a priority rank for the data columns of the data entity. Based on the priority rank, the data profiling service can compute a second data profile for a second data column of the data entity. The second data profile can be stored in a cache for rapid retrieval when the user requests the second data profile.

20 Claims, 12 Drawing Sheets

OPTIMIZING THE RESPONSE TIME OF DATA PROFILING IN INTERACTIVE SESSIONS

BACKGROUND

Cloud-based services provide solutions for profiling data to obtain quantitative measures of data quality. A cloud-based data service may be implemented by a distributed computing system for performing operations to handle user requests. Many data services allow users to work with large data sets interactively, with users sending requests and queries to the distributed computing system and receiving responses in near-real time. The requests can include requests for data profiling, which can increase latency while the distributed computing system retrieves data and computes one or more characteristics included in the requested data profile. A need exists for improved predictive handling of data entities to increase the speed and efficiency of data profiling in interactive sessions.

BRIEF SUMMARY

Embodiments of the present disclosure relate to providing predictive selection of data for profiling in advance of a user's request. More particularly, some embodiments provide methods, computer-readable medium, and systems that implement a data recommender service that can determine, during a user's interactive session, which data is most likely to be selected for data profiling. The data recommender service can base its determination on the user's past interactions with data entities, the interactions of similar users, and similarities between one data entity and another. The data recommender service can employ one or more predictive techniques, including content based filtering and collaborative filtering, to determine a priority for which data to profile before the user requests data profiling. The data profiles computed can be stored in a cache so that when the user requests data profiling on a selection of data, the system can provide the cached profile to the user rapidly without having to compute the profile upon request.

One embodiment is directed to a method performed by a distributed computing system providing a data profiling service and a data recommender service. The method can include receiving an indication that a first data column of a plurality of data columns has been selected, for example, by a user during an interactive data session. The plurality of data columns can constitute a data entity. The data entity can be a data entity that the user works with during the interactive session.

In response to the indication, the data profiling service can obtain a first profile for the first data column. The first profile may be a first data profile, with the first profile including information derived from data profiling on the data corresponding to the first data column. Profile information can include statistical information, data quality information, and the like. In some embodiments, obtaining the first profile can include retrieving entity data from a data store of the distributed computing system. The entity data may correspond to one or more of the plurality of data columns. The data profiling service can use the retrieved entity data to perform computations to determine first characteristics (e.g., a statistical value, a data completeness value, a data domain, a data sensitivity classification, and a data size) of the first data column. The retrieved entity data may be stored in a cache. In some other embodiments, obtaining the first profile can include retrieving the first profile from the cache.

The method also includes determining a priority rank for the plurality of data columns. The priority rank can be determined by the data recommender service. According to certain embodiments, the data recommender service can collect interaction information corresponding to previous selections of the plurality of data columns. The data recommender service can then use the interaction information as inputs into a predictive model to compute a prediction value for each of the plurality of data columns. In some embodiments, the predictive model is a machine learning model, where the data recommender service provides the interaction information as input data to the machine learning model and receives the prediction value as output data from the model. In other embodiments, the predictive model is based on collaborative filtering and/or content based filtering. The prediction value generated with the predictive model can be used to assign the priority rank to each of the plurality of data columns.

The method further includes identifying a second data column of the data entity. The second data column may be a highly "ranked" data column according to the priority rank, which can correspond to a likelihood that the second data column will have a data profile requested (e.g., by a user). The data profiling service can obtain a second data profile for the second data column and store the second profile in a cache.

In some embodiments, obtaining the second profile can include retrieving the entity data from the cache (where it was previously stored by the data profiling service after computing the first profile) and determining second characteristics. The second characteristics may be similar to the first characteristics.

In some other embodiments, similar ranking and profiling may occur for related data entities rather than data columns in a single data entity. The data recommender service can receive entity relationship information associated with the data entity and additional data entities. The entity relationship information may be provided by a source system hosting or otherwise associated with a data store containing the data entity. Similar to using interaction information to determine the first priority rank, the data recommender service can use the entity relationship information to compute a second priority rank. Based at least in part on the second priority rank, the data profiling service can identify a related data entity of the additional data entities. This related data entity can include additional data columns. The data profiling service may then obtain a third profile for at least one of the additional data columns, which it can store in the cache.

Another embodiment is directed to a distributed computing system including one or more processors and one or more memories storing computer-executable instructions that, when executed with the one or more processors, cause the distributed computing system to receive an indication that a first data column of a plurality of data columns has been selected. In response to the indication, a data profiling service of the distributed computing system can obtain a first profile for the first data column. The first profile may be a first data profile, with the first profile including information derived from data profiling on the data corresponding to the first data column. Profile information can include statistical information, data quality information, and the like.

The instructions may further cause the distributed computing system to determine a priority rank for the plurality of data columns. The priority rank can be determined by a data recommender service of the distributed computing system. The instructions may further cause the distributed computing system to identify, based at least in part on the priority rank, a second data column of the plurality of data columns; obtain a second profile for the second data column; and store the second profile in a cache associated with the data profiling service.

In some embodiments, obtaining the first profile can include retrieving entity data from a data store of the distributed computing system. The entity data may correspond to one or more of the plurality of data columns. The data profiling service can use the retrieved entity data to perform computations to determine first characteristics of the first data column. The retrieved entity data may be stored in the cache. In some other embodiments, obtaining the first profile can include retrieving the first profile from the cache.

According to certain embodiments, the instructions can cause the distributed computing system to collect interaction information corresponding to previous selections of the plurality of data columns. The distributed computing system can then use the interaction information as inputs into a predictive model to compute a prediction value for each of the plurality of data columns. In some embodiments, the predictive model is a machine learning model, where the data recommender service provides the interaction information as input data to the machine learning model and receives the prediction value as output data from the model. The prediction value generated with the predictive model can be used to assign the priority rank to each of the plurality of data columns.

In some embodiments, obtaining the second profile can include retrieving the entity data from the cache, where it was previously stored by the data profiling service after computing the first profile, and determining second characteristics. The second characteristics may be similar to the first characteristics.

In some other embodiments, similar ranking and profiling may occur for related data entities rather than data columns in a data entity. The instructions can cause the distributed computing system to receive entity relationship information associated with the data entity and additional data entities. The entity relationship information may be provided by a source system hosting or otherwise associated with a data store containing the data entity. The data recommender service can use the entity relationship information to compute a second priority rank. Based at least in part on the second priority rank, the data profiling service can identify a related data entity of the additional data entities. This related data entity can include additional data columns. The data profiling service may then obtain a third profile for at least one of the additional data columns, which it can store in the cache.

Yet another embodiment is directed to a non-transitory computer readable medium storing computer-executable instructions that, when executed by one or more processors, cause a computing system to receive an indication that a first data column of a plurality of data columns has been selected. In response to the indication, a data profiling service of the computing system can obtain a first profile for the first data column. The first profile may be a first data profile, with the first profile including information derived from data profiling on the data corresponding to the first data column.

The instructions may further cause the computing system to determine a priority rank for the plurality of data columns. The priority rank can be determined by a data recommender service of the computing system. The instructions may further cause the computing system to identify, based at least in part on the priority rank, a second data column of the plurality of data columns; obtain a second profile for the second data column; and store the second profile in a cache associated with the data profiling service.

In some embodiments, obtaining the first profile can include retrieving entity data from a data store of the computing system. The entity data may correspond to one or more of the plurality of data columns. The data profiling service can use the retrieved entity data to perform computations to determine first characteristics of the first data column. The retrieved entity data may be stored in the cache. In some other embodiments, obtaining the first profile can include retrieving the first profile from the cache.

According to certain embodiments, the instructions can cause the computing system to collect interaction information corresponding to previous selections of the plurality of data columns. The computing system can then use the interaction information as inputs into a predictive model to compute a prediction value for each of the plurality of data columns. In some embodiments, the predictive model is a machine learning model, where the data recommender service provides the interaction information as input data to the machine learning model and receives the prediction value as output data from the model. The prediction value generated with the predictive model can be used to assign the priority rank to each of the plurality of data columns.

In some embodiments, obtaining the second profile can include retrieving the entity data from the cache and determining second characteristics. The second characteristics may be similar to the first characteristics.

In some other embodiments, the instructions can cause the computing system to receive entity relationship information associated with the data entity and additional data entities. The entity relationship information may be provided by a source system hosting or otherwise associated with a data store containing the data entity. The data recommender service can use the entity relationship information to compute a second priority rank. Based at least in part on the second priority rank, the data profiling service can identify a related data entity of the additional data entities. This related data entity can include additional data columns. The data profiling service may then obtain a third profile for at least one of the additional data columns, which it can store in the cache.

DETAILED DESCRIPTION

Figure 1:
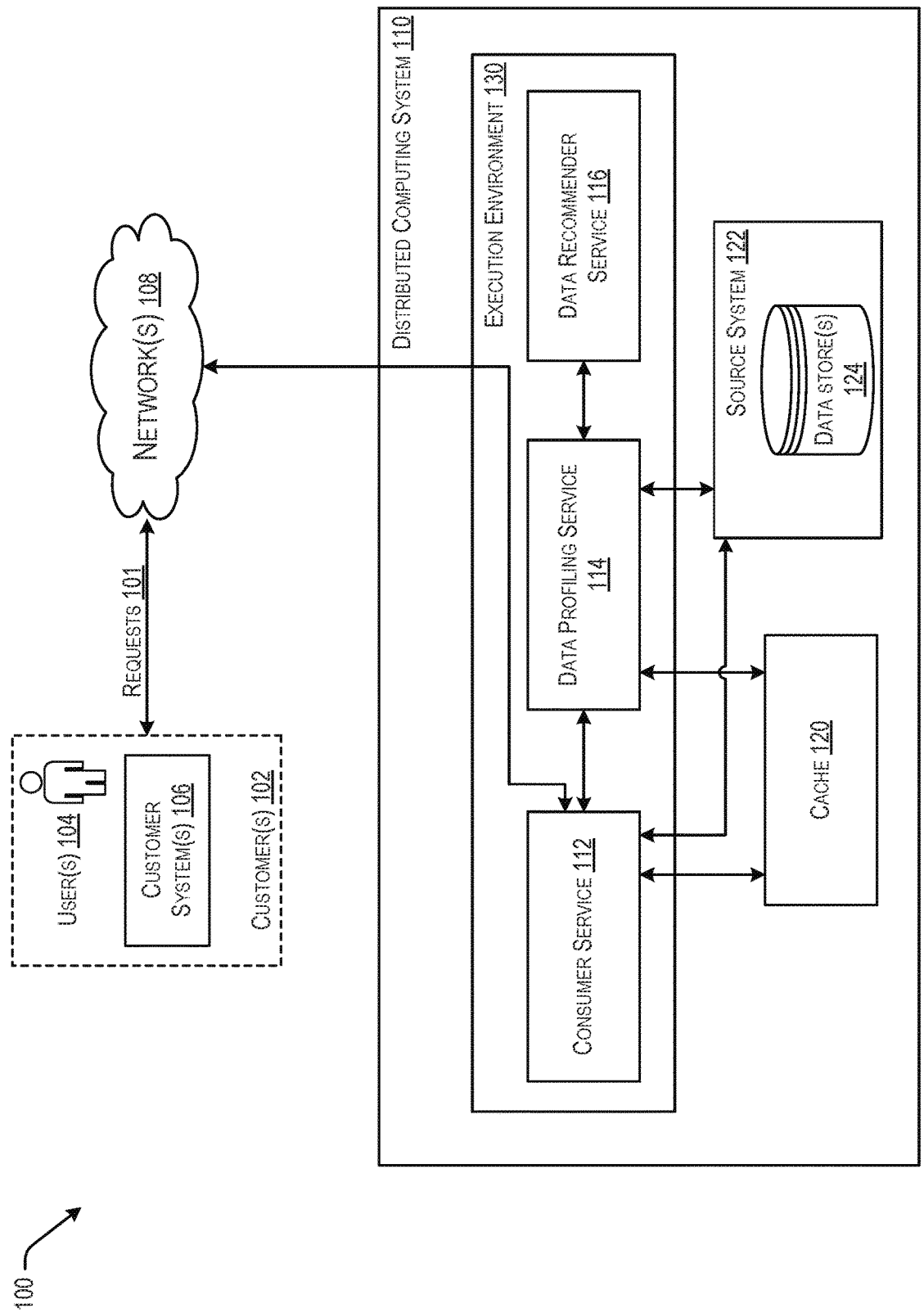
FIG. 1 depicts a distributed computing system that includes a data profiling service and a data recommender service, according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. Any embodiment or design described herein as "exemplary" or an example is not necessarily to be construed as preferred or advantageous over other embodiments or designs.

Distributed computing systems, including cloud-based platforms and other cloud computing systems, have become increasingly common for providing fast, reliable, and scalable solutions for processing large volumes of data. Providing a distributed computing system in a cloud computing environment gives these data processing capabilities to multiple customers of the cloud computing environment. Recent developments in the distributed computing space allow for processing of interactive queries on large data sets in near-real time, with a requesting user launching queries and expecting results at a user interface interactively. One highly valuable data operation is data profiling, allowing a user to obtain quantitative measurements (e.g., statistical analyses) and qualitative assessments (e.g., data completeness) of sets and subsets of data. During an interactive session, the profile information can be displayed alongside the data under examination, providing immediate contextual information for the user. Depending on the size of the data set, computing the profile information can be time consuming, such that the user experiences significant latency during the interactive session. Techniques disclosed herein are directed to methods, systems, and computer-readable storage media for providing a data recommender service within a distributed computing system to improve the speed and efficiency of data profiling services.

Customer data may come in different forms and be stored in various storage locations. The data (e.g., data objects) can be in the form of files, tables, databases, object stores, big data warehousing systems, (e.g., Hive), structured data, unstructured data, blobs, etc. The data may be stored in data warehouses, on-premises data stores, on one or more devices within a distributed network, in a cloud environment (or more than one cloud environment), and the like. In several examples used herein, the data can be stored according to a relational model (e.g., in a relational database). The data can constitute one or more data entities, which are an abstraction of the traditional notion of tables within a relational database. As used herein, the term data entity refers to the corresponding data of a relationship described by the data entity. One of skill in the art will realize the applicability of data entities to similar existing data models (e.g., an entity-relation model). A data entity can represent one or more columns and rows, with rows corresponding to an instance of the entity type (e.g., customer #1 of the entity Customers) and columns corresponding to attributes related to the entity (e.g., customer name, customer ID, etc.). As used throughout this disclosure, the terms data column and data entity may refer to the underlying data represented by the entities or columns, respectively.

Data profiling can include analysis of data to determine structure, relationships, content (e.g., values and types of data), derivation rules, and the like for the data. Profiling typically includes operations related to statistical analyses of numerical data (e.g., computing the mean, median, maximum, minimum, etc.), frequency analysis (e.g., duplication detection, value frequency across attributes, etc.), data completeness checks (e.g., identifying missing data), data type detection (e.g., identifying data types across rows or columns, verifying type consistency, etc.), pattern analysis (e.g., identifying credit card numbers, email addresses, etc.), and the like. The results of profiling a set of data can be used to assess overall data quality of a data source or data entity, including whether the data is suitable for further use. For example, a data analysis project may require that the data to be used in the project be substantially complete so that the results may be reported with high confidence.

Data profiling can also be used to recognize sensitive data and flag anomalous data. For example, databases, data warehouses, and other data stores can contain personally identifiable information (PII), protected health information (PHI), and the like, which require special handling to preserve confidentiality or comply with various regulations. Not all data in a data entity will be PII or PHI, so the ability for a data profiling service to recognize which data fall into these categories can be valuable to the user when taking subsequent actions. For instance, the user may wish to reduce a data set to exclude PII/PHI for use in a project that is not suitable for sensitive information. Similarly, flagging anomalous data can allow a user to take steps to remedy the anomaly (e.g., filling missing data from another data source) and improve the quality of the data.

According to some embodiments, a distributed computing system can implement a data profiling service for profiling data. During an interactive session, a user may work with a data entity. As part of the operation, the user can select a column from the entity (for inspection or other data operations) and request a data profile be computed for the data column. The data profiling can perform the requested operations and provide the user with the profile information. The profile information can include the results from one or more of the profiling operations described above, and can constitute the data profile.

The user can further select additional data columns in the entity. For one or more of these additional data columns, a data profile may be requested. The data profiling service can then perform the requested operations and provide additional profiles for the data columns.

In addition to determining the data profiles, the data profiling service can retrieve previously computed profile information corresponding to the data columns and provide the profile information to the user. In some instances, a profile information for a data column (or for a data entity) may already exist and be stored in a cache associated with the distributed computing system. The data profiling service can retrieve the existing profile information and provide it on request.

In some embodiments, a second data entity may be selected, and data columns of the second data entity selected, for use in the interactive session. This second data entity may include data related to the first data entity. For example, the first data entity can include data for "Customers," with data columns/attributes corresponding to "Customer IDs," "Customer Names," and the like, while the second data entity may include data for "Payments," with data columns corresponding to "Payment IDs," "Payment Method," "Payment Amount," and similar. The "Payments" data entity may be related to the "Customers" data entity (e.g., rows of the "Customers" entity can correspond to rows of the "Payments" entity, relating customers and customer payments). As with first data entity, the data profiling service can determine data profiles for the second data entity.

Because data profiling incurs a computational cost, it can introduce a noticeable latency during an interactive session when a user selects a data column and requests a data profile for that data column. This latency can be reduced by performing the data profiling in advance of the user's selection (or other indication or request for profile information for a data column). The data profiling service then can retrieve the profile information from a cache and provide it to the user. However, performing data profiling on all the data of a data entity in advance would likely be excessive and incur a large upfront computational and time cost. The user may not need profile information for all data columns in a data entity. Unneeded profile information may additionally occupy storage resources within the distributed computing system.

In some embodiments, a data recommender service can be implemented in the distributed computing system to perform predictive techniques to identify which data columns of a data entity are most likely to have a data profile requested. The data recommender service can use content based filtering, collaborative filtering, or similar techniques to determine a priority rank of additional data columns in a data entity for profiling. The priority rank can correspond to a predicted likelihood that a user will request profile information for that data column during the interactive session. The data profiling service can then use the priority rank and compute profiles for the additional data columns according to their ranking. For example, a data entity may have 50 data columns, and the data recommender service can rank some or all of the 50 columns. The data profiling service can then compute a data profile for each ranked column in the order of the ranking, such that the data profiling service computes a profile for the data column ranked first in the priority ranking. This computation of additional profiles can occur in a background thread of the data profiling service, allowing the data profiling service to respond to further requests.

To determine the priority ranking, in some embodiments the data recommender service can track interactions of users with one or more data entities to obtain interaction information. Interaction information can include the data types of columns for which the user requests profiles, the pattern of selection of data columns (e.g., the order of selections, selecting one column followed by another, etc.), the pattern of requesting profiles (e.g., the order of profile requests), the names of columns for which the user requests profiles, and the like. The interaction information can also include information about the user and groups of similar users as well as information about the data entities with which the user interacts, for instance groups of related data entities, the source systems hosting the data entities (e.g., proprietary cloud service providers), and the source system instance information. Additionally, the data recommender service can track similar selection and request patterns for multiple data entities.

The data recommender service can then use the interaction information in collaborative filtering and content based filtering. Collaborative filtering techniques can compute a score or other quantitative value corresponding to the likelihood that a user will make a particular request or selection based on that user's past interactions. For example, a user who has in the past requested profile information for a "Customer ID" data column followed immediately by requesting profile information for a "Customer Name" data column may have a high likelihood of requesting the "Customer Name" profile after selecting the "Customer ID" data column. The data recommender service can determine a priority rank that gives the "Customer ID" data column a high ranking. Then, based on an indication that the user has selected the "Customer ID" data column, the data profiling service can compute a profile for the "Customer Name" data column in a background thread. If the user then selects the "Customer Name" data column and requests the data profile, the profile can be available in a cache and can be rapidly provided to the user by the data profiling service.

Content based filtering techniques can similarly compute a score corresponding to the likelihood that a user will make a selection or request based on the data in a data entity and the interaction information. For example, the data recommender service can identify related data entities or other similar data entities to the data entity that a user is working with in the interactive session. Based on the user's interactions with the data entity, the data recommender service can determine a priority rank of data columns in the related data entities. The data recommender service can also use interaction information from the related data entities to determine a priority rank of data columns in the current data entity even in cases where there is no interaction information for the particular user with the current data entity.

Identifying data columns from a data entity for profiling in advance of a request for the data profile provides numerous advantages. Conventional techniques are limited in that either data profiles are computed upon request, which introduces significant latency in an interactive session, or data profiles are computed for the entire data entity when it is retrieved for the session, which can provide profiles to the user quickly upon request but is computationally expensive and time consuming. Additionally, profiling an entire data entity can be extremely wasteful of computing resources, since data entities can contain tens of thousands of data columns and the user may not require data profiles for every column. The techniques described herein balance the competing need for near-real time interactive sessions and the computational expense of computing data profiles for large data sets. By performing predictive prioritization of data columns, the data profiles for the most likely to be requested data columns can be computed in the background of an interactive session. Thus, a user will experience minimal or no latency during the interactive session as additional profiles are requested, since the user is highly likely to select data column for which a profile has already been computed and cached. Moreover, computational resources are preserved by intelligently limiting profile computations to a subset of the data in a data entity.

Turning now to the figures, FIG. 1 depicts a distributed computing system 110 in a cloud computing environment 100 that includes a data profiling service 114 and a data recommender service 116, according to some embodiments. The distributed computing system 110 may be implemented by one or more computing systems that execute computer-readable instructions (e.g., code, program) to implement the distributed computing system. As shown in FIG. 1, the distributed computing system 110 includes various systems and/or modules including an execution environment 130, consumer service 112, data profiling service 114, and data recommender service 116. Portions of data or information (e.g., profile data, locally cached data from a data entity, etc.) used by or generated by the systems shown in FIG. 1 may be stored in a cache 120. A source system 122 can host one or more data store(s) 124 storing data (e.g., data entities) of databases, data objects, and the like. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The distributed computing system 110 may be implemented in various different configurations. In the embodiment shown in FIG. 1, the distributed computing system 110 may be implemented on one or more servers of a cloud provider network and its consumer service 112, data profiling service 114, and data recommender service 116 may be provided to subscribers of cloud services on a subscription basis. In some embodiments, an execution environment (e.g., execution environment 130) may represent an environment (e.g., a "client" node(s), host node(s), etc.) for executing any number of software applications, software instances, processes, or other programs, including the consumer service 112, the data profiling service 114, and the data recommender service 116.

Different execution environments may be associated with a tenant (e.g., a customer). Although not depicted in FIG. 1, customer(s) 102 can represent one or more tenants of the distributed computing system 110. Each tenant may be associated with one or more execution environments. An execution environment may be configured to perform operations in a coordinated fashion utilising any suitable number of computing nodes. A "computing node" (also referred to herein as a "node") may include a server, a computing device, a virtual machine, or any suitable physical or virtual computing resource configured to perform operations as part of the execution environment. Resources in the computing environment 100 can be a pool of cloud infrastructure services that includes additional services not pictured in FIG. 1, including additional database services, virtual cloud networking services, data catalog services, identity and access management services, and the like. Examples of providing cloud infrastructure as a service are described in greater detail below with respect to FIGS. 8-12.

The computing environment 100 comprising the distributed computing system 110 depicted in FIG. 1 is merely an example and is not intended to unduly limit the scope of claimed embodiments. One of ordinary skill in the art would recognize many possible variations, alternatives, and modifications. For example, in some implementations, the distributed computing system 110 can be implemented using more or fewer systems than those shown in FIG. 1, may combine two or more systems, or may have a different configuration or arrangement of systems.

In some embodiments, customer(s) 102 can interact with the distributed computing system 110 via any suitable computing device, interface, or system. Customer(s) 102 can include user(s) 104 and customer system(s) 106, which can include other services, applications, programs or the like interacting with (or as part of) the distributed computing system 110. Customer interactions can take the form of requests 101. The requests 101 can include various types of software requests including API calls, remote procedure calls, SQL queries, or other requests to access, use, or otherwise interact with a software component. The requests 101 can be transmitted to (or within) the distributed computing system 110 via one or more network(s) 108 (e.g., the Internet or other public network). Although not shown in FIG. 1, requests 101 may be received at a gateway within the distributed computing system 110, which can pass the requests to a server (e.g., a proxy service or API server) that is ultimately responsible for directing the requests to the target software components (e.g., one or more data services).

In certain embodiments, a user (e.g., user(s) 104) may interact with the distributed computing system 110 via a computing device that is communicatively coupled to the distributed computing system 110 possibly via the network(s) 108 (e.g., the Internet). The computing device may be of various types, including but not limited to, a mobile phone, a tablet, a desktop computer, and the like. A user may interact with the cloud computing system using a console user interface (UI) (which may be a graphical user interface (GUI)) of an application executed by the computing device or via API operations provided by the distributed computing system 110. For instance, the user may interact with the distributed computing system 110 to perform operations on one or more data entities, run interactive queries against data stored in the data store(s) 124, request data profiles, and receive results of the data profiling.

As an example, a user may interact with the distributed computing system 110 through the consumer service 112 as part of an interactive session for data warehousing. The consumer service 112 can be a service or application for data integration (e.g., Oracle Data Integration Service). The consumer service 112 can provide the user tools to configure data sources (e.g., source system 122) for creating a data flow for integrating the data into a data warehouse. As part of the configuration of the data source, the user can interact with a data entity corresponding to the source data for the warehousing (e.g., via a GUI), to select and view one or more data columns. The user can also request and obtain profile information for the selected data column. Based on the profile information, the user can take additional actions to transform the data, correct anomalies, or fill missing data before continuing with the warehousing.

The data profiling service 114 can compute a data profile for the selected data column on request. However, as discussed above, computing profile information can be time consuming, such that the user may wait a period of time before the profile information is provided. To minimize this delay, the data recommender service 116 can determine a priority rank for the data columns of the data entity. Continuing the data integration example above, when configuring a data source for a warehousing data flow, a user may select several data columns to review profile information. The same user may have performed similar requests in the past on the same or similar data entities. The data recommender service 116 can use past user interactions and/or other interaction information as inputs into a predictive model using collaborative filtering and content based filtering. Based on the priority, the data profiling service 114 can compute additional data profiles for additional data columns in the data entity. When the user selects subsequent data columns for inspection, the data profiling service 114 can retrieve the previously computed profile result from a local cache (e.g., cache 120) instead of computing the profile at the time of selection.

In some embodiments, data profiling service 114 can store profile information in the cache 120. In a distributed computing system (e.g., distributed computing system 110), a cache (e.g., cache 120) may represent a small amount of dynamic random access memory (DRAM) or other memory of a computing node. Typically, the cache will be "close" to the central processing unit of the computing node, to reduce latency in storage and retrieval operations with the cache. In certain embodiments, the cache 120 may be associated with one or more nodes hosting the consumer service 112 or the data profiling service 114, so as to reduce the time needed to store and retrieve data from the cache 120 during an interactive session with the consumer service 112. Additionally, consumer service 112 may store a portion of the data corresponding to data entities retrieved by the consumer service 112 in the cache 120. The data profiling service 114 can then use the cached data when computing profile information in response to a user request or in advance of a user request.

Figure 2:
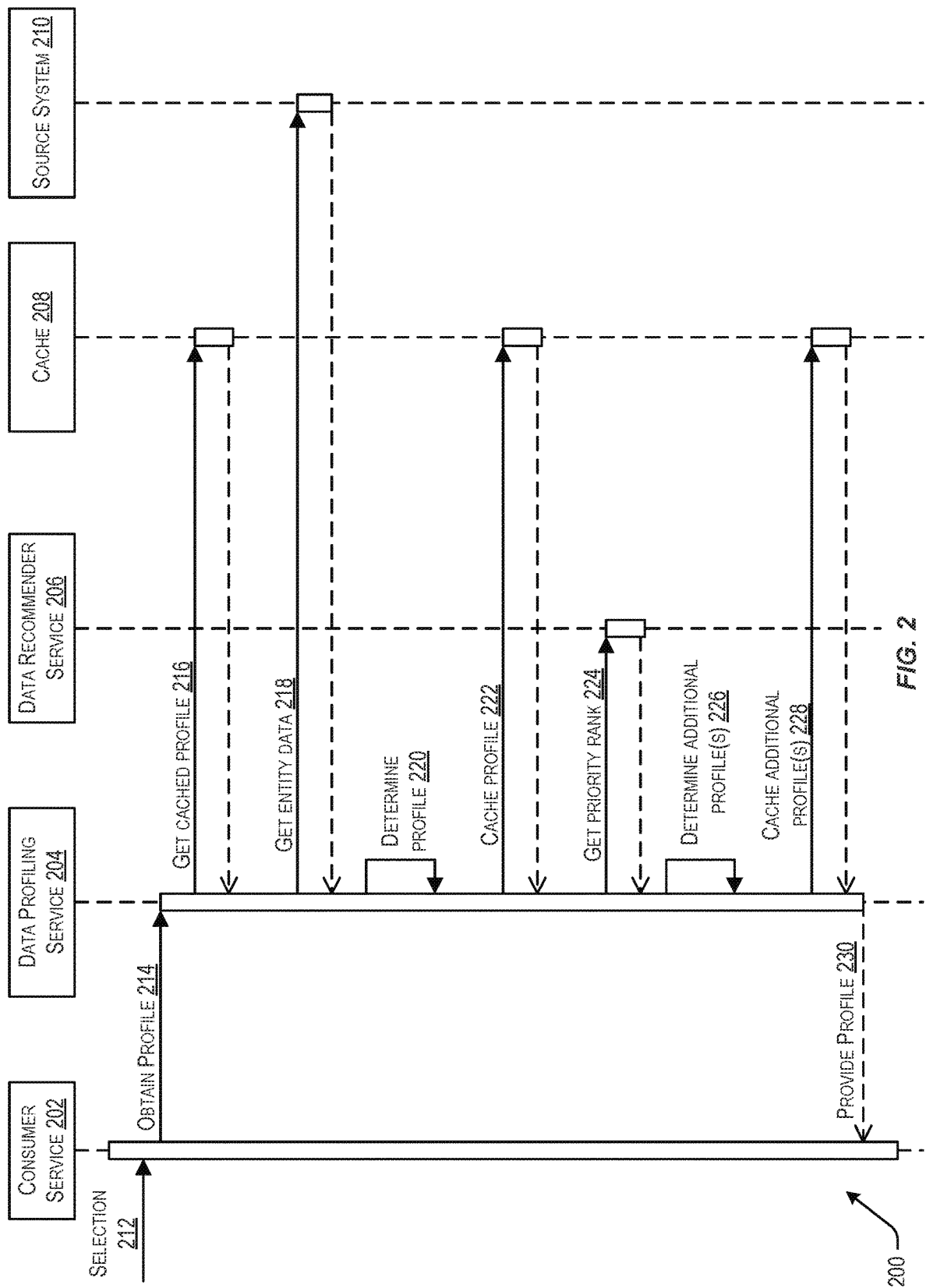
FIG. 2 is a sequence diagram illustrating an example process for determining data profiles, according to some embodiments.

FIG. 2 is a sequence diagram illustrating an example data flow 200 for determining data profiles, according to some embodiments. The data flow 200 may occur within a distributed computing system, for example the distributed computing system 110 of FIG. 1. The distributed computing system can include consumer service 202, data profiling service 204, data recommender service 206, cache 208, and source system 210. Each of these systems may be similar to the corresponding system described above with respect to FIG. 1 (e.g., the consumer service 202 may be similar to consumer service 112, the data recommender service 206 may be similar to data recommender service 116, etc.).

In data flow 200, the consumer service 202 can receive a selection 212 corresponding to a user selecting a data column, data entity, or other action or selection within an interactive session. For example, selection 212 may correspond to the user selecting a first data column for inspection and data profiling. Based on the selection (or request), the consumer service 202 can call the data profiling service 204 to obtain profile 214.

Upon receipt of the obtain profile 214 call, the data profiling service 204 may check the cache 208 for a previously computed and stored data profile. If the check results in a cache hit (that is to say, the requested data profile exists in the cache), the data profiling service 204 can get cached profile 216, wherein the data profile is retrieved from the cache.

Alternately, in some embodiments, the check of the cache 208 may result in a cache miss. A cache miss may be the result of the requested data profile not being present in the cache. A cache miss may also result from the expiration of a time-to-live or other value indicating that the cached data profile is no longer valid. For example, a previously computed data profile may be present in the cache 208, but the underlying data used to create that profile may have been subsequently updated, rendering the data profile invalid. In these cases, the requested data profile may be computed from entity data corresponding to the selected data column. To compute the data profile, the data profiling service 204 may get entity data 218 from the source system 210 (e.g., from a data store or database hosted within the source system 210). The retrieved entity data may optionally be stored in cache 208.

The retrieved entity data may include data corresponding to the selected column. In some embodiments, the retrieved data may include additional column data. Using the entity data, the data profiling service can determine profile 220 to compute the data profile. The computed profile may be stored by the data profiling service 204, which can cache profile 222.

After either retrieving the cached data profile or computing the data profile, the data profiling service 204 can get priority rank 224 from the data recommender service 206. The priority rank can correspond to a prediction from a predictive model (e.g., content based filtering, collaborative filtering, a machine learning semantic model, etc.) of which other data columns in the data entity for which the user is likely to request data profiles. Based on the rank, the data profiling service 204 can determine additional profile(s) 226. The additional profiles may be determined in a sequential order corresponding to the priority rank (e.g., the highest ranked data column's profile is computed first, the second highest ranked data column's profile is computed second, etc.). In some embodiments, the data profiling service 204 may compute one or more of the additional profiles simultaneously, but devote computing resources to the computation in accordance with the priority rank (e.g., the highest ranked data column receives 50% of the data profiling service's computing resources, the second highest ranked data column receives 25%, etc.). The data profiling service 204 can then cache additional profile(s) 228.

Regardless of whether the requested data profile was initially found in the cache or computed by the data profiling service 204, the data profile is provided to the consumer service 202. The user may view, inspect, or take other actions with regard to the data profile via the consumer service 202. Subsequently, if the user selects another data column of the data entity, the data profiling service 204 may retrieve one of the additional profiles stored in the cache corresponding to the selected data column and provide it to the consumer service 202.

Figure 3:
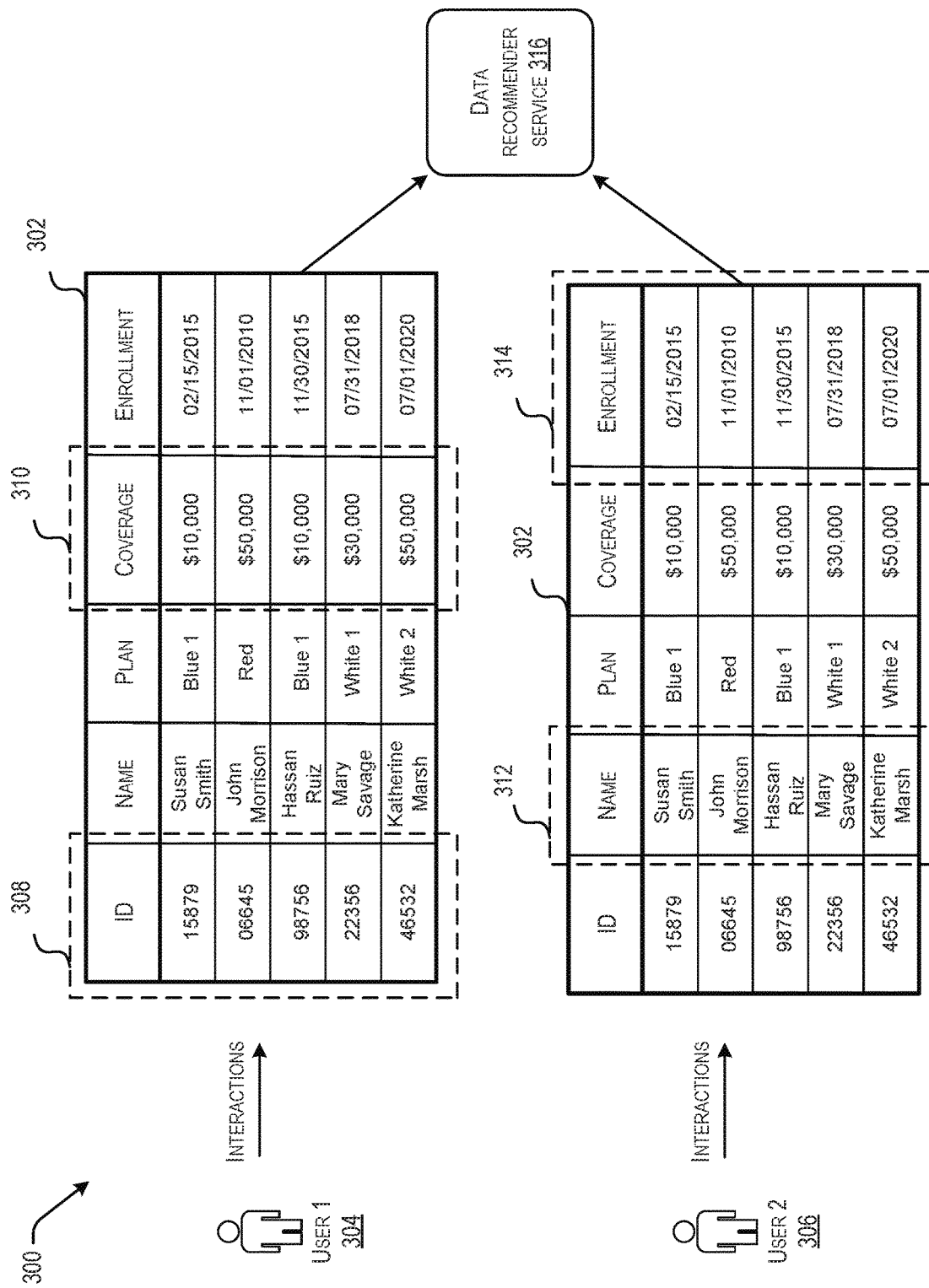
FIG. 3 is a simplified diagram depicting user interactions with an example data entity, according to some embodiments.

FIG. 3 is a simplified diagram depicting user interactions 300 with an example data entity 302, according to some embodiments. User interaction information may be tracked by data recommender service 316 (which may be an example of other data recommender services described herein, such as data recommender service 116 of FIG. 1).

As shown in FIG. 3, a first user 304 may interact with the data entity 302. As described above, the interactions may be via a consumer service (e.g., consumer service 202) and can include selecting data columns for inspection (via a GUI). In the exemplary depiction of FIG. 3, the data entity 302 may correspond to data for enrollment in various health insurance plans. As depicted, data entity 302 can have data columns corresponding to "ID" (e.g., customer identification numbers), "Name" (e.g., customer names), "Plan" (e.g., names of health insurance plans), "Coverage" (e.g., an amount of health insurance coverage), and "Enrollment" (e.g., an enrollment date). The data entity 302 shown in FIG. 3 may represent a portion of a larger data entity.

The data columns of data entity 302 can include data of various types. For example, fields in the "ID" column may be integer data, fields in the "Coverage" column may be numeric currency, and fields in the "Name" column may be text strings. Other data types can include, without limitation, Boolean, array, floating point, dates, times, or binary data. Additionally, one or more of the data columns may correspond to sensitive information (e.g., PII or PHI). For example, customer names in a health insurance context may be classified as PII, PHI, or both.

In some embodiments, as part of the interactive session, the first user 304 may select a data column 308 corresponding to "ID." Subsequently, the first user 304 may select a data column 310 corresponding to "Coverage." The data recommender service 316 may collect and store interaction information that includes the selection order (e.g., selecting column 308 followed by column 310), the data types of each column selected (e.g., integer for column 308, decimal for column 310), and the names of each selection (e.g., "ID" and "Coverage").

Similarly, a second user 306 can, in a different interactive session, work with the same data entity 302. As with the first user 304, the second user 306 can select one or more columns. For example, the second user 306 may select column 312 corresponding to "Name" and then subsequently select column 314 corresponding to "Enrollment." The data recommender service 316 may collect and store the second user 304's interaction information. Although depicted as having selected only two columns each, the first user 304 and the second user 306 are not so limited and may each make multiple selections, including repeated selections of data columns. In addition, the users 304, 306 may request profiles for only some of the data columns selected during the respective interaction sessions. The data recommender service 316 may track and store interaction information as described above for all data columns selected (e.g., viewed, inspected, etc.) or only for data columns for which profile information was requested.

In some embodiments, the first user 304 and the second user 306 may be similar users. The data recommender service 316 can track information used to identify similar users and place similar users into groups (e.g., store information relating one or more similar users). For example, the first user 304 and the second user 306 may both use the same consumer service for data processing. The users 304, 306 may also frequently access the same or similar source systems, the same or related data entities, or may make the same or similar interactions with the data via the consumer service (e.g., select the similar data columns in the same order). Based on this identification of user similarities, the data recommender service 316 can determine a priority rank for data columns during one user's session based on another user's past history.

Figure 4:
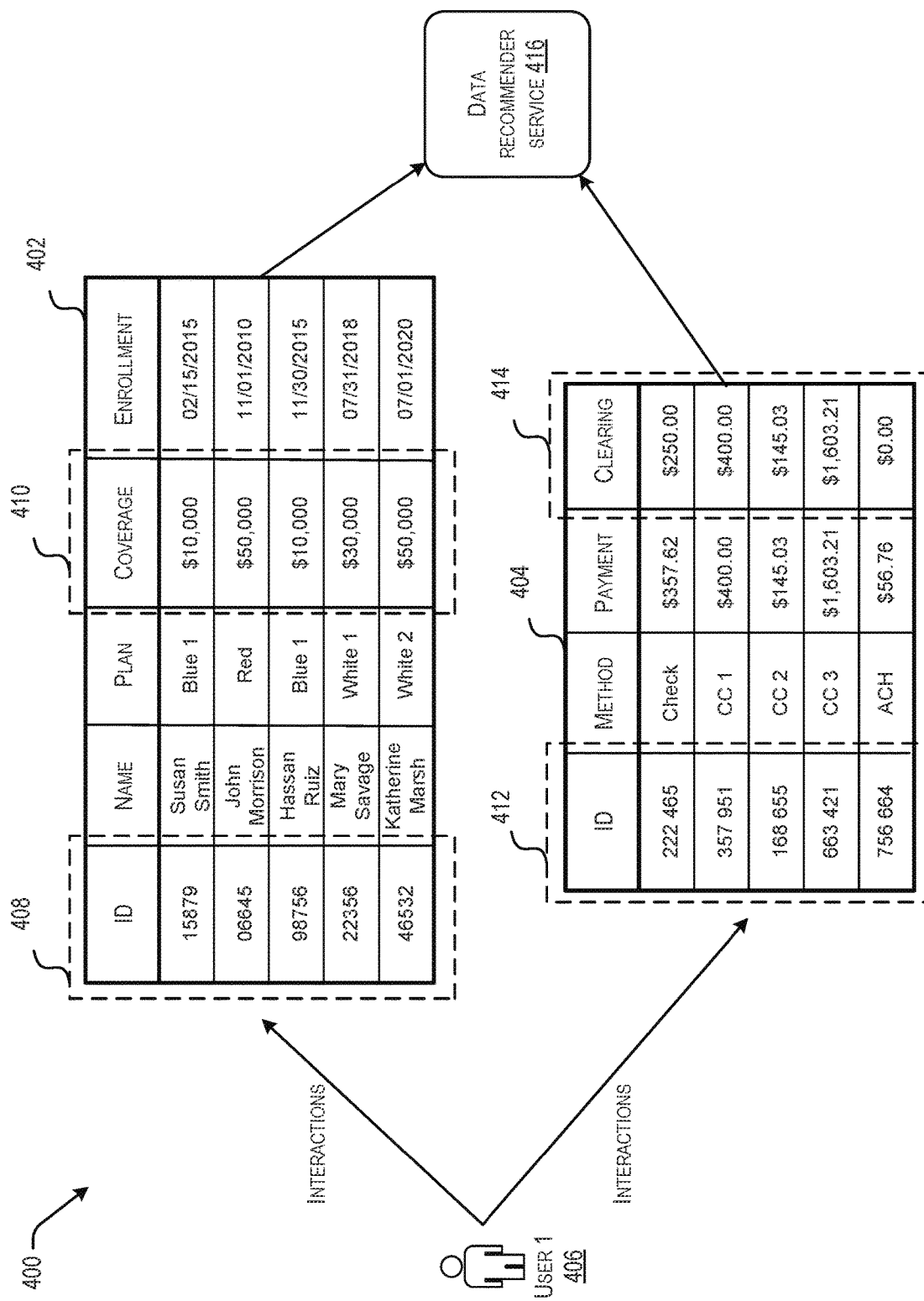
FIG. 4 is another simplified diagram depicting user interactions with example related data entities, according to some embodiments.

FIG. 4 is another simplified diagram depicting user interactions 400 with example related data entities 402, 404, according to some embodiments. User interaction information may be tracked by data recommender service 416 (which may be similar to data recommender service 316). As with FIG. 3, the user interactions may be via a consumer service (e.g., consumer service 202). Exemplary data entity 402 may be similar to data entity 302.

As shown in FIG. 4, a user 406 may interact with data entity 402 in a similar manner as described for the first user 304 of FIG. 3. For example, the user 406 may, during an interactive session with a consumer service (e.g., a data integration service), select column 408 corresponding to "ID" and then select column 410 corresponding to "Coverage." For one or both of these selections, the user 406 may request a data profile. As described previously, the data recommender service 416 may similarly track and store the interaction information corresponding to the selection or request pattern of the columns, the names of the columns selected, and the data types of the columns selected.

In some embodiments, the user 406 may, subsequent to working with data entity 402, begin working with data entity 404. In the exemplary depiction of FIG. 4, the data entity 404 may correspond to data for payments. As depicted, data entity 404 can have data columns corresponding to "ID" (e.g., a payment identifier), "Method" (e.g., a payment method like credit card, check, clearing house, etc.), "Payment" (e.g., a payment amount), and "Clearing" (e.g., a clearing amount). As with data entity 402, data entity 404 may also represent a portion of a much larger data entity.

In some embodiments, data entity 404 may be related to data entity 402. For example, the payments data of data entity 404 may correspond to payments by customers under health insurance plans, the data of which are included in data entity 402. Information about whether a data entity is related to another data entity may be provided by a source system hosting the related data entities (e.g., source system 122). The data recommender service 416 can retrieve the related entity information from the source system. According to certain embodiments, the data recommender service may determine a related data entity based on user interaction information (e.g., selection patterns of subsequent data entities may indicate a relatedness).

Figure 5:
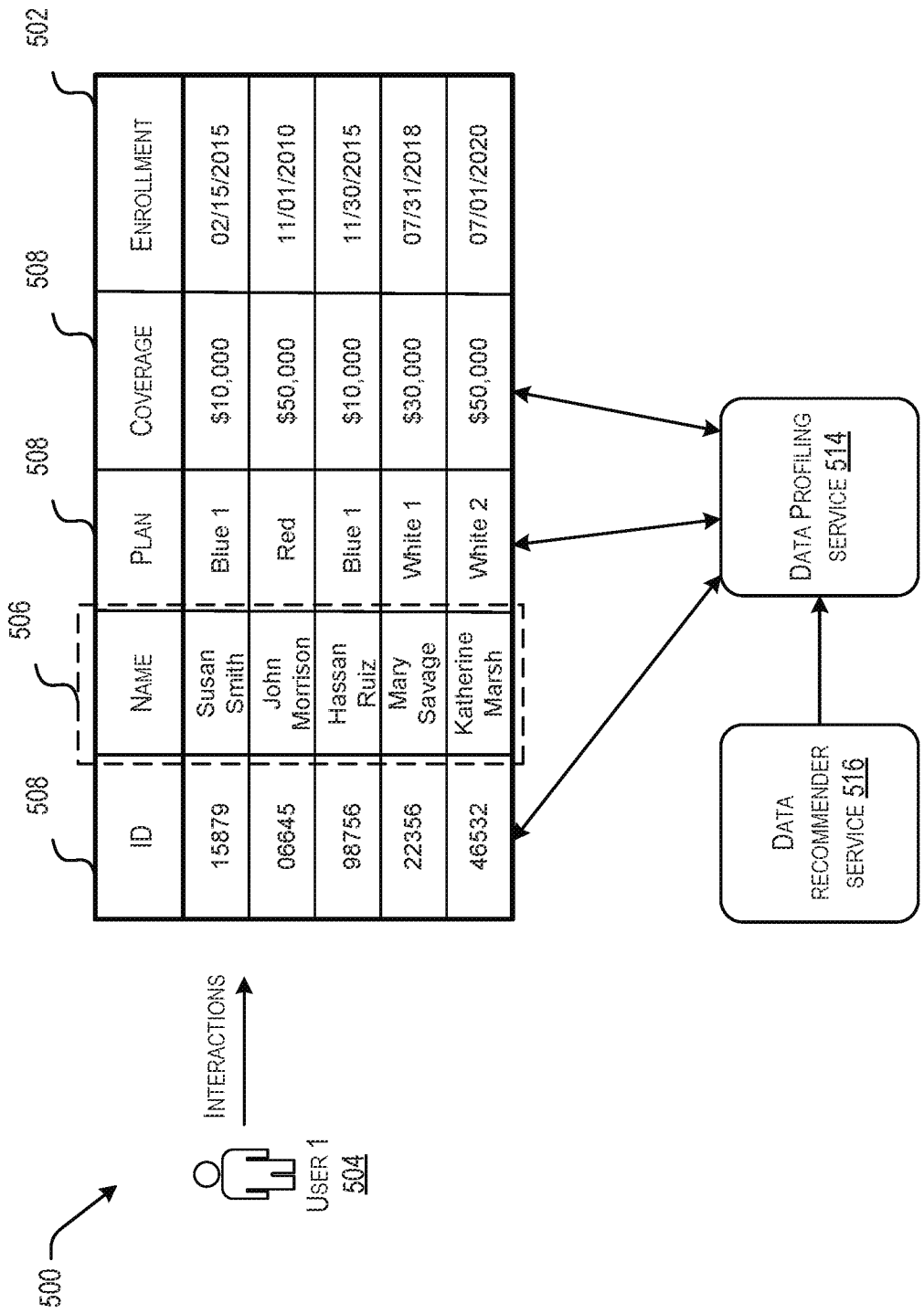
FIG. 5 is a simplified diagram illustrating a data profiling service profiling additional data columns from an example data entity, according to some embodiments.

FIG. 5 is a simplified diagram illustrating an example process 500 for a data profiling service 514 profiling additional data columns 508 from an example data entity 502, according to some embodiments. The data entity 502 may be similar to data entities 302 and 402 discussed above with respect to FIGS. 3 and 4, respectively. Similarly, data recommender service 516 and data profiling service 514 may be similar, respectively, to one or more data recommender services or one or more data profiling services discussed herein (e.g., data recommender service 416, data profiling service 204).

The process 500 may include operations similar to portions of the data flow 200 of FIG. 2. A user 504 may select data column 506 corresponding to "Name" from data entity 502. Based on the selection, the data profiling service 514 may obtain a data profile for data column 506 and provide it to the user 504. The data profiling service 514 may then receive a priority rank from data recommender service 516 and use the priority rank to compute additional profiles for the additional data columns 508. For example, the data recommender service 516 may determine a priority rank that ranks "ID" highest, "Name" next highest, "Coverage" third highest, "Plan" fourth highest, and "Enrollment" fifth highest. After obtaining the data profile for the selected data column 506, the data profiling service 514 can compute a data profile for "ID," followed by "Coverage" and then "Plan." The computation of the additional data profiles may occur in a background thread spawned by the data profiling service 514. In some embodiments, the number of additional data profiles computed in the background may be limited to a set value (e.g., a limit value or depth value). For example, the data profiling service 514 may only compute data profiles for the highest ranked 3, 5, 10, or other number of data columns within the data entity.

In some embodiments, the data recommender service 516 can employ collaborative filtering and content based filtering to determine the priority rank. A collaborative filtering method can include a memory based approach or a model based approach. In the memory based approach, the interaction information tracked by the data recommender service 516 may be used to determine one or more scores for each data column of a selected data entity. Determining the scores can include computing a similarity value (e.g., a cosine similarity, Pearson correlation, Jaccard similarity, mean squared difference, or other measure of similarity). For example, for a user's (e.g., user 504) interaction information, the data recommender service 516 can compute a similarity value that correlates each data column of the current data entity with the user's past interactions with the data entity. The correlation may be based on quantities including selection percentage (e.g., how often the user selects a data column) and a weight or priority value for each data column. A high selection percentage can be associated with a high "preference" for that data column, data column name, or data column data type.

In the model based approach, the interaction information may be used as an input into a predictive model (e.g., a machine learning model). The predictive model can output scores for each data column of the data entity. The predictive model can be trained on interaction information to set model parameters by optimizing a model algorithm (e.g., gradient descent or the like). The interaction information for the user 504 can be input into the model, and output data received from the model to obtain scores corresponding to a predicted correlation between the user 504's previous selections and interactions with the data columns of the data entity.

In some embodiments, collaborative filtering can be used to determine scores for the data columns based on different categories of tracked interaction information. The categories can include data type selection (e.g., values corresponding to past requests for profiles of columns with particular data types), name pattern selection (e.g., values corresponding to past requests for profiles based on the column names), and selection pattern (e.g., values corresponding to past requests for sequences of data columns). For example, data recommender service 516 can determine scores for each data column based on information that user 504 selects data columns containing predominantly integer data. Then, scores for data columns containing integer data (e.g., ID numbers) can be higher than scores for data columns containing text data (e.g., names). Additionally, collaborative filtering may be used to determine similarity values and scores for correlations between the interaction information of a user and one or more similar users.

Content based filtering methods are similar to those of collaborative filtering, but are used to compare the contents of data sets rather than compare user interactions with the data sets. For example, content base filtering can determine a term frequency associated with the frequency with which a particular characteristic (e.g., value, data type, name, string, etc.) appears in the data set. As used with the techniques described herein, content based filtering may be employed to determine scores for the data columns in one data entity based on data columns in a related data entity. For example, data entity 502 includes data columns for "ID," "Name," and "Enrollment," corresponding to integer, text, and date data types. A related data entity (e.g., a payments data entity) may have columns for "ID," "Name," and "Payment Date," corresponding to integer, text, and date data types. Based on a frequency of the same data types in the related data entities, content based filtering can be used to determine scores for the data columns in a data entity.

In some embodiments, the data recommender service 516 can determine scores or other prediction values for the data columns of data entity 502 based on data type pattern, name pattern, selection pattern, similar data entities, similar user interaction information, and other similar categories. Each category of scores may have a weight value. For example, scores for the data columns based on name pattern may be weighted by a weight value of 1 (that is, a full weight), while scores based on selection pattern may be weighted by a weight value of 0.5 (that is, weighted half as much). Alternatively or in addition to, each category of scores may have a max contribution value. For example, the scores based on name pattern may have a max contribution value of 10 (such that any computed scores that exceed 10 are capped at 10), while scores based on similar users have a max contribution value of 5.

To determine the priority rank, the scores for each category can be summed to provide final values for the data columns. The sum may be a weighted or unweighted sum. The final values can correspond to the rank, such that the highest final value corresponds to the highest rank.

According to certain embodiments, the priority rank can be updated after a selection or request for a data profile for a data column. For example, the user 504 can select column 506 for data profiling. The data profiling service 514 may begin computing data profiles for additional data columns 508. The user 504 may then select one of the additional data columns 508 (e.g., "ID") and request a data profile for the new selection. Based on the selection of the data column, the data recommender service 516 may update the priority rank. The updated priority rank can result in a change in the rankings of the data columns in the data entity. As such, the data profiling service 514 may modify the order of computing the additional data profiles to account for the updated priority rank. In this way, the system can predictively determine data profiles on the most likely candidates for data profiling requests from the user, maintaining efficiency even as circumstances change during the user's interactive session.

In some embodiments, the data recommender service 516 can determine a priority rank for additional data entities in addition to ranking data columns within a data entity. The data entity priority rank may be determined in accordance with the methods described above. For example, a source system may identify related data entities to the data entity used by the user in the interactive session. The data recommender service can employ collaborative filtering and content based filtering to compute scores and a ranking of the related entities. The scores can be based on interaction information from the user and other similar users, including patterns of selecting successive data entities (similar to the patterns of successive data columns). Based on the data entity priority rank, the data profiling service 514 can compute data profiles for one or more data columns in the highest ranked data entities.

Figure 6:
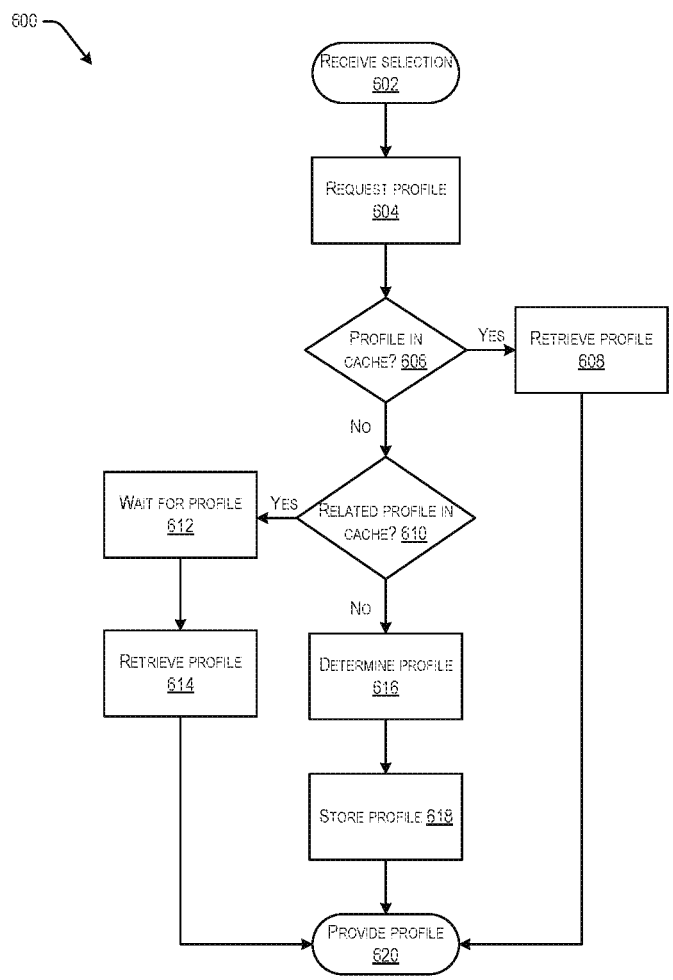
FIG. 6 is a flow diagram of an example process for identifying that a related profile is in a cache and waiting for a requested profile to be computed, according to some embodiments.

FIG. 6 is a flow diagram of an example process 600 for identifying that a related profile is in a cache and waiting for a requested profile to be computed, according to some embodiments. The process 600 may be performed by a distributed computing system (e.g., distributed computing system 110). The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the process 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Process 600 begins at start point 602 by the distributed computing system receiving a selection of a data column (e.g., a user selects a data column during an interactive session). Based on the selection, the distributed computing system (e.g., a consumer service of the distributed computing system) can request a data profile, at block 604. The request may be made to a data profiling service (e.g., data profiling service 114) of the distributed computing system.

At decision 606, the data profiling service can check whether the requested profile already exists in a cache associated with the distributed computing system. If yes, then the data profiling service can retrieve the existing profile at block 608 and provide it to the consumer service at end point 620. If the requested profile exists in the cache but has exceeded a time-to-live value or other value corresponding to the validity of the underlying data, the data profiling service may indicate a cache miss and proceed as if the profile were not in the cache.

If the profile is not in the cache (or otherwise indicates a cache miss), the data profiling service can check whether a related profile is in the cache, at decision 610. A related profile may be a profile for a data column that was computed based on a current priority rank. Because computing the data profiles can take some period of time, the background thread of the data profiling service may still be computing the requested data profile at the time the cache was checked at decision 606. For example, the data profiling service may have begun computing data profiles for three data columns of a data entity. The requested profile may be the second (by rank) of the three data columns for which the data profiling service is computing profiles. If the data profiling service checks and finds the data profile for the first (by rank) of the three data columns in the cache, then the background thread may be computing the second data profile. To improve efficiency of the system, the check for the related profile at decision 610 may indicate that the requested profile is imminently available and will soon be cached. The data profiling service can then wait for the profile to be computed and cached, at block 612, and then retrieve the requested profile from the cache at block 614 and provide it to the consumer service at end point 620.

If a related profile is not in the cache, then the data profiling service can determine the requested profile, at block 616. The determined profile may be stored in the cache, at 618, and also provided to the consumer service, and hence the user, at end point 620.

Figure 7:
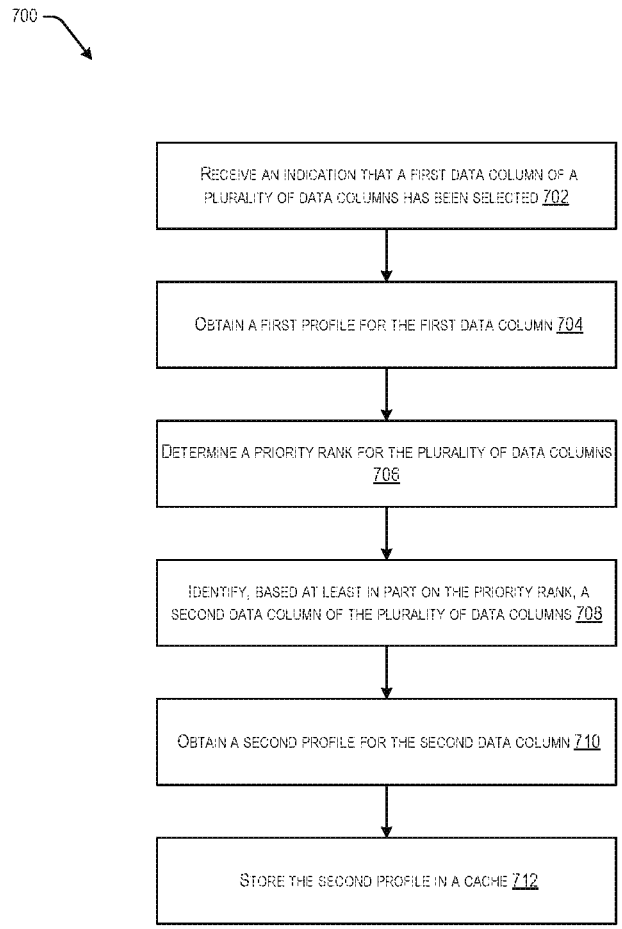
FIG. 7 is a simplified flow diagram of an example process for determining a profile for a second data column in response to a selection of a first data column, according to some embodiments.

FIG. 7 is a simplified flow diagram of an example process 700 for determining a profile for a second data column in response to a selection of a first data column, according to some embodiments. Process 700 may begin at block 702, with a data profiling service receiving an indication that a first data column of a plurality of data columns of a data entity has been selected. The data profiling service may be implemented in a distributed computing system (e.g., the distributed computing system 110 of FIG. 1). The data profiling service may be similar to any of the data profiling services described herein.

At block 704, the data profiling service can obtain a first profile for the first data column. The profile can be a data profile as described throughout this disclosure. In some embodiments, the data profiling service can obtain the first profile by retrieving entity data from a data store of the distributed computing system. The entity data may include data corresponding the plurality of data columns. The entity data may be stored in the cache. Once the underlying entity data has been retrieved, the data profiling service can determine characteristics for the first data column. The characteristics can constitute the data profile and may include a statistical value (e.g., mean, median, variance, min-max range, largest value, smallest value, etc.), a data completeness value (e.g., number of missing fields in the data column), a data domain (e.g., a specification of the values that the fields in the data column may take), a data sensitivity classification (e.g., whether the data is PII, PHI, confidential, classified, or other sensitivity indicator), and a data size. In some embodiments, the data profiling service can obtain the first profile by retrieving the first profile from the cache associated with the data profiling service. The data profiling service may have previously computed the requested first profile and stored it in the cache.

At block 706, a data recommender service can determine a priority rank for the plurality of data columns. The data recommender service can be implemented in the distributed computing system and may be similar to any of the data recommender services described herein, including data recommender service 116 of FIG. 1. Determining the priority rank can include collecting and storing interaction information for users interacting with the data entity and then using the interaction information to compute a prediction value (e.g., a score) for the plurality of data columns. The data recommender service can employ a predictive model to compute the prediction values. The predictive model may include one or more techniques related to collaborative filtering or content based filtering. In some embodiments, the predictive model can be a machine learning model (e.g., a semantic model, a deep neural network, a transformer-encoder, etc.). The interaction information can be input into the machine learning model, which can, in turn, produce output data including the prediction values for plurality of data columns.

At block 708, based on the priority rank, the data profiling service can identify a second data column of the plurality of data columns. This second data column can be the highest "ranked" data column according the priority rank, where the ranking corresponds to a likelihood that a user will request a data profile for the data column. In some embodiments, the data profiling service can identify more than one additional data column of the plurality of data columns, ranked according to the priority rank.

At block 710, the data profiling service can obtain a second profile for the second data column. Obtaining the second profile can include retrieving the entity data from the cache (where it was stored after being retrieved when computing the first profile) and determining second characteristics of the second data column. The second characteristics can include similar values as for the first characteristics (e.g., a statistical value).

Once the second profile has been obtained, the data profiling service may then store the second profile in the cache, at block 712. The cached second profile can then be available for subsequent requests. Because it is stored in the cache, providing the second profile to a requesting user can occur quickly, without waiting for the profile to be computed.

In some embodiments, the data recommender service may receive entity relationship information associated with the data entity and additional data entities in the data store. The entity relationship information may be provided by a source system hosting or otherwise associated with a data store storing the data entity. The data recommender service can compute a second priority rank using the predictive model for the additional data entities. For example, if the user is working with a first data entity for "Customers," the data recommender service can compute a priority rank for data entities related to "Customers," for instance "Payments" or "Accounts." Computing the second priority rank may be similar to computing the first priority rank for the data columns of the data entity. The data profiling service can then identify a related data entity from the additional data entities. The related data entity can have one or more additional data columns. The data profiling service may then compute a third profile for at least one of the additional data columns. This third profile may also be stored in the cache for later retrieval when it is requested.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 8:
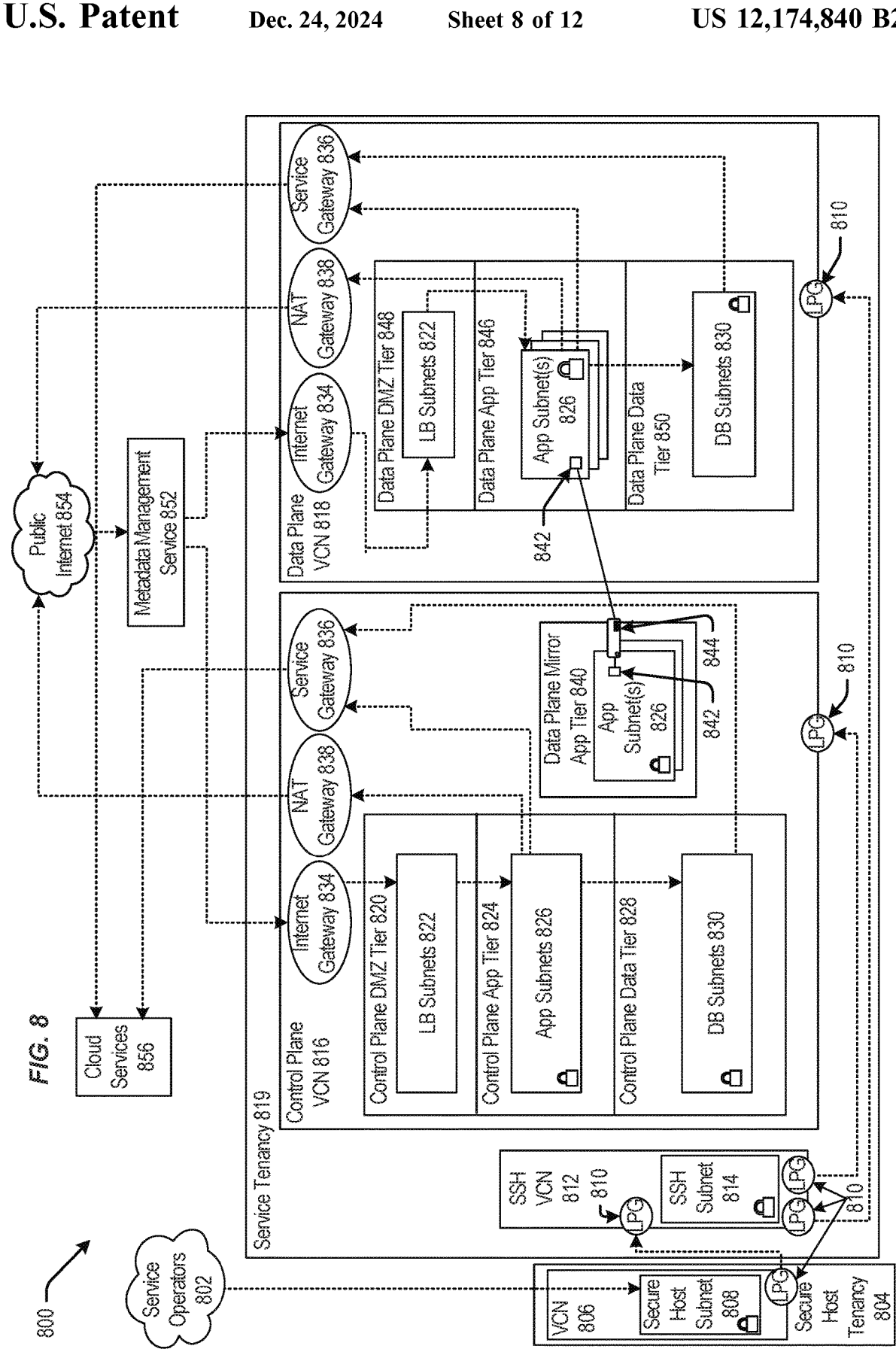
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
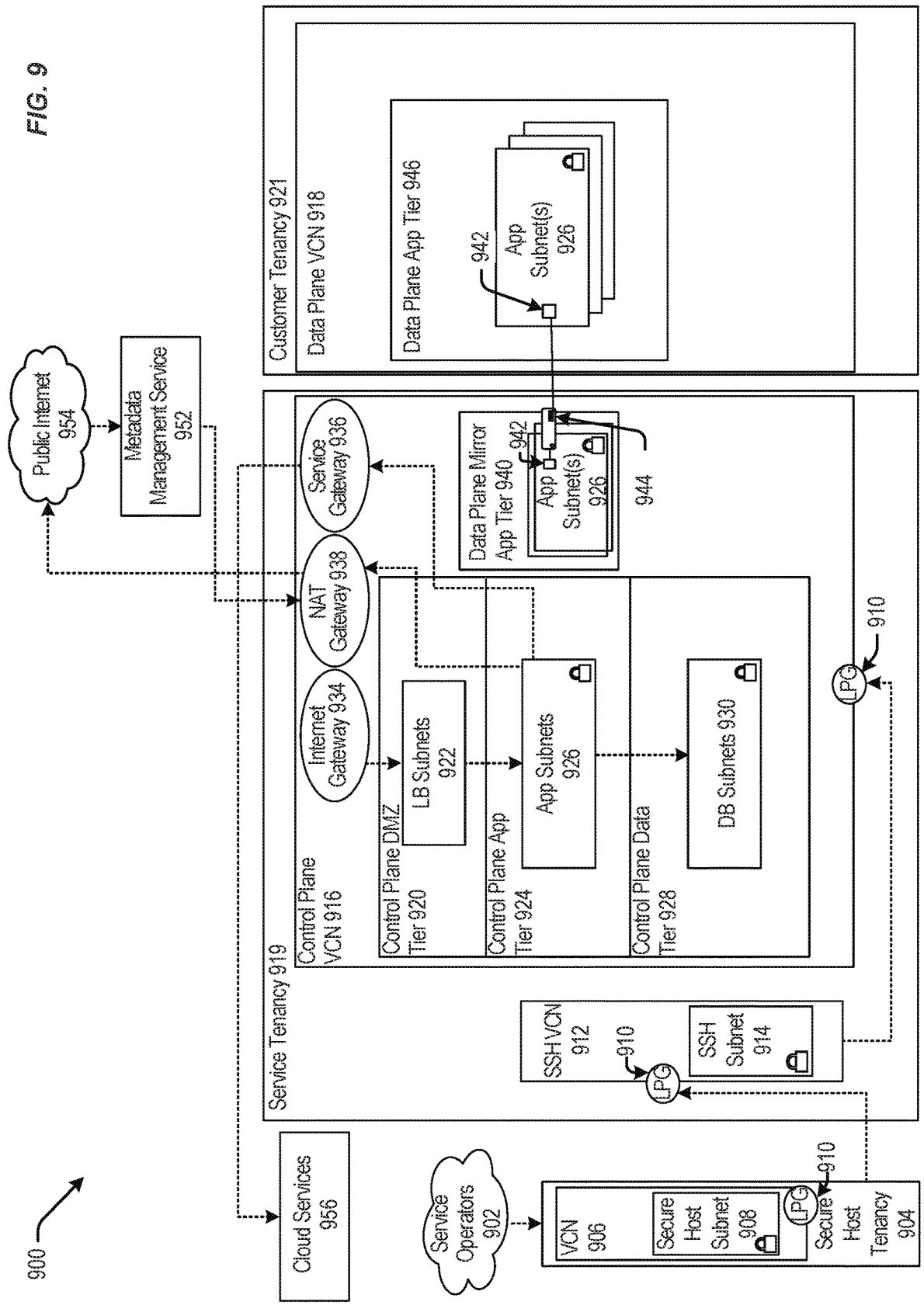
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
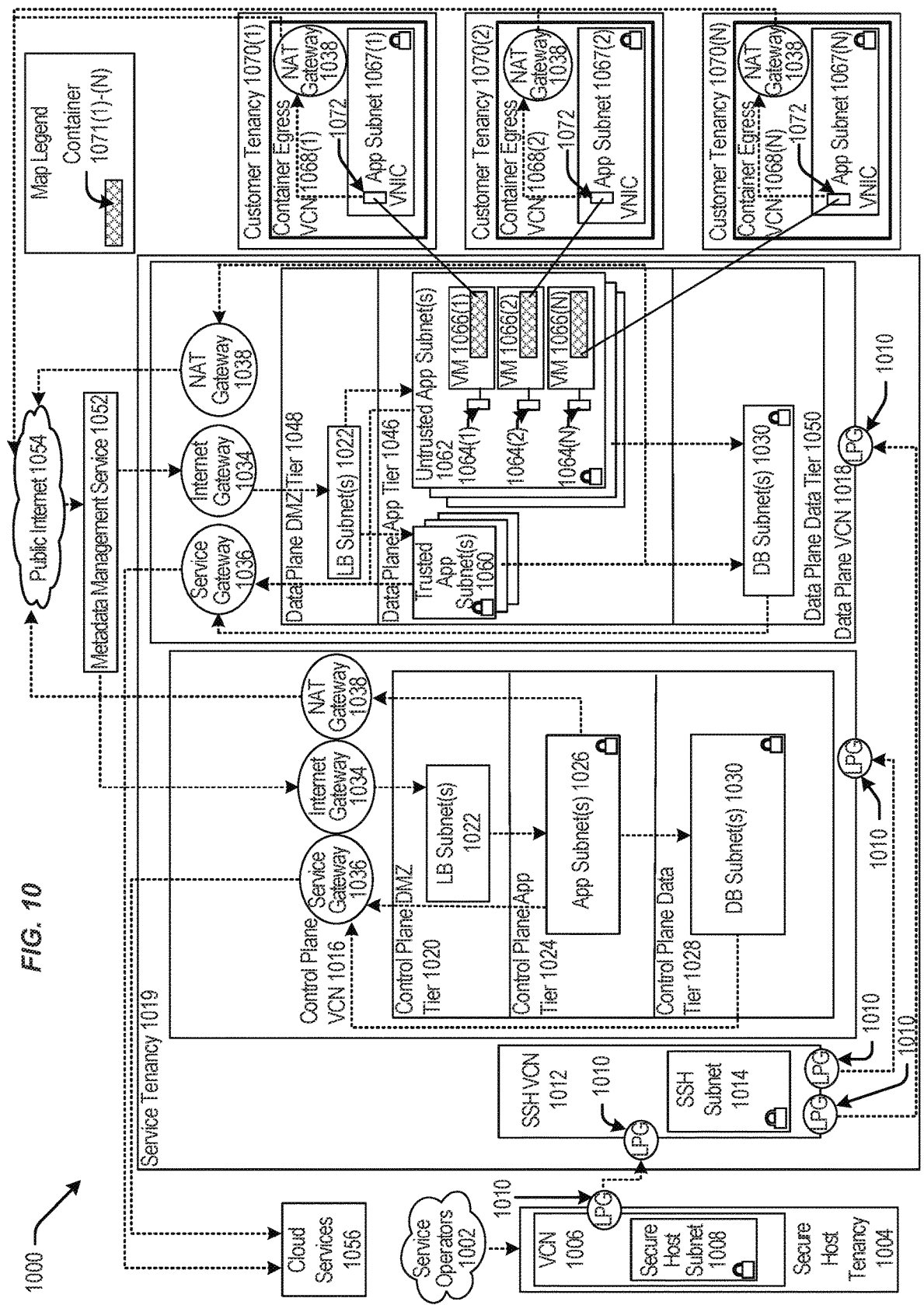
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e g similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the entrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
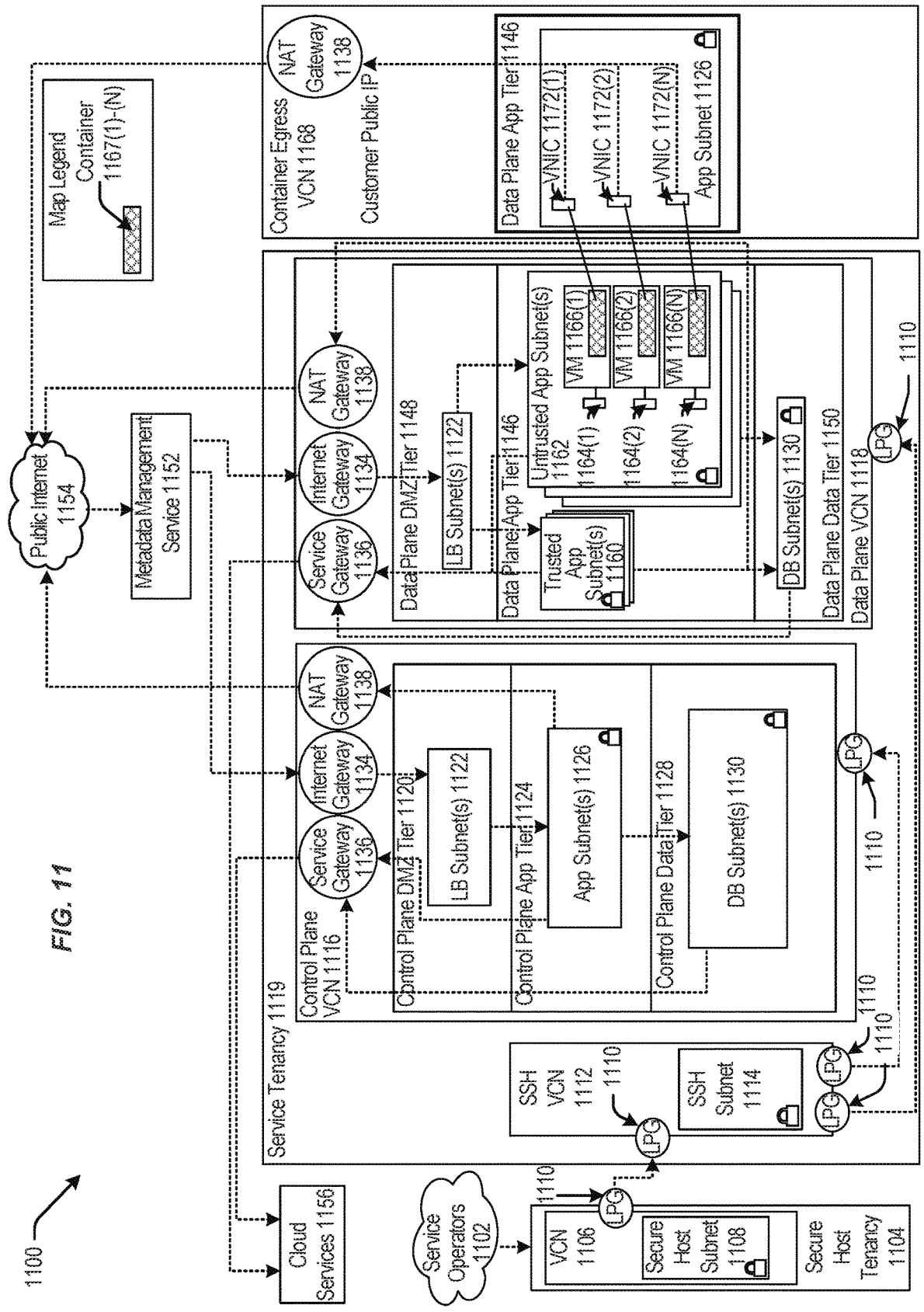
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
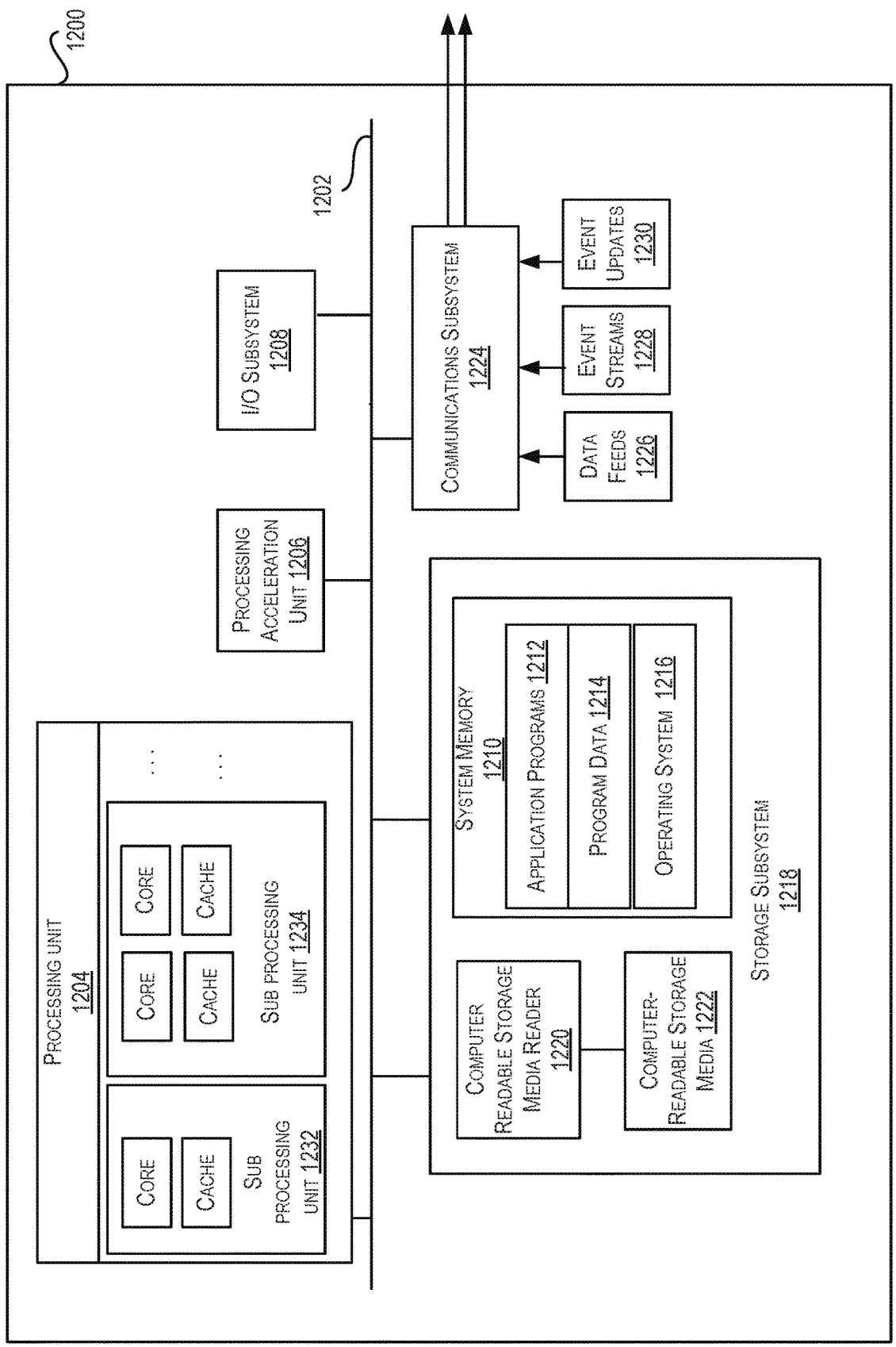
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    while in an interactive session, receiving, by a data profiling service of a distributed computing system, an indication that a first data column of a plurality of data columns has been selected, the plurality of data columns comprising a data entity;
    obtaining, by the data profiling service in response to the indication, a first profile for the first data column; and
    responsive to receipt of the indication, executing a background thread of the interactive session to at least:
        determine, by a data recommender service of the distributed computing system and based at least in part on interaction information corresponding to previous selections of the plurality of data columns out of the interactive session, a priority rank for the plurality of data columns of the data entity;
        identify, by the data profiling service and based at least in part on the priority rank, a second data column of the plurality of data columns;
        obtain, by the data profiling service, a second profile for the second data column by at least determining, using the data entity, second characteristics for the second data column; and
        storing the second profile in a cache associated with the data profiling service.

2. The method of claim 1, wherein the data entity is a first data entity, wherein the priority rank is a first priority rank, and further comprising:
    receiving, from a source system associated with a data store storing the first data entity, entity relationship information associated with the first data entity and additional data entities in the data store;
    determining, by the data recommender service using a predictive model, a second priority rank for the additional data entities;
    identifying, based at least in part on the second priority rank, a related data entity of the additional data entities, the related data entity comprising additional data columns;
    obtaining, by the data profiling service, a third profile for at least one of the additional data columns; and
    storing the third profile in the cache associated with the data profiling service.

3. The method of claim 1, wherein obtaining the first profile comprises:
    retrieving entity data from a data store of the distributed computing system, the entity data corresponding to the plurality of data columns; and
    determining, using the entity data, first characteristics of the first data column.

4. The method of claim 3, wherein obtaining the second profile comprises:
    retrieving the entity data from the cache associated with the data profiling service; and
    determining, using the entity data, second characteristics of the second data column.

5. The method of claim 3, wherein the first characteristics comprise at least one of a statistical value, a data completeness value, a data domain, a data sensitivity classification, and a data size.

6. The method of claim 1, wherein obtaining the first profile comprises retrieving the first profile from the cache associated with the data profiling service.

7. A distributed computing system, comprising:
    one or more processors; and
    one or more memories storing computer-executable instructions that when executed with the one or more processors, cause the distributed computing system to:
        while in an interactive session, receive, by a data profiling service of the distributed computing system, an indication that a first data column of a plurality of data columns has been selected, the plurality of data columns comprising a data entity;
        obtain, by the data profiling service in response to the indication, a first profile for the first data column; and
        responsive to the receipt of the indication, executing a background thread of the interactive session to at least:
            determine, by a data recommender service of the distributed computing system and based at least in part on interaction information corresponding to previous selections of the plurality of data columns out of the interactive session, a priority rank for the plurality of data columns of the data entity;
            identify, by the data profiling service and based at least in part on the priority rank, a second data column of the plurality of data columns;
            obtain, by the data profiling service, a second profile for the second data column by at least determining, using the data entity, second characteristics for the second data column; and
            store the second profile in a cache associated with the data profiling service.

8. The distributed computing system of claim 7, wherein the data entity is a first data entity, wherein the priority rank is a first priority rank, and comprising further instructions that, when executed by the one or more processors, further cause the distributed computing system to:
    receive, from a source system associated with a data store storing the first data entity, entity relationship information associated with the first data entity and additional data entities in the data store;
    determine, by the data recommender service using a predictive model, a second priority rank for the additional data entities;
    identify, based at least in part on the second priority rank, a related data entity of the additional data entities, the related data entity comprising additional data columns;
    obtain, by the data profiling service, a third profile for at least one of the additional data columns; and
    store the third profile in the cache associated with the data profiling service.

9. The distributed computing system of claim 7, wherein obtaining the first profile causes the distributed computing system to:
    retrieve entity data from a data store of the distributed computing system, the entity data corresponding to the plurality of data columns; and
    determine, using the entity data, first characteristics of the first data column.

10. The distributed computing system of claim 9, wherein obtaining the second profile causes the distributed computing system to:
    retrieve the entity data from the cache associated with the data profiling service; and
    determine, using the entity data, second characteristics of the second data column.

11. A non-transitory computer-readable storage medium comprising executable instructions that, when executed by one or more processors of a distributed computing system, cause the distributed computing system to:

while in an interactive session, receive, by a data profiling service of the distributed computing system, an indication that a first data column of a plurality of data columns has been selected, the plurality of data columns comprising a data entity;

obtain, by the data profiling service in response to the indication, a first profile for the first data column;

responsive to the indication, executing a background thread of the interactive session to at least:

determine, by a data recommender service of the distributed computing system and based at least in part on interaction information corresponding to previous selections of the plurality of data columns out of the interactive session, a priority rank for the plurality of data columns of the data entity;

identify, by the data profiling service and based at least in part on the priority rank, a second data column of the plurality of data columns;

obtain, in the background thread, a second profile for the second data column, by at least determining, using the data entity, second characteristics for the second data column; and store the second profile in a cache associated with the data profiling service.

12. The non-transitory computer-readable storage medium of claim 11, wherein the data entity is a first data entity, wherein the priority rank is a first priority rank, and comprising further instructions that, when executed by the one or more processors, further cause the computing system to:

receive, from a source system associated with a data store storing the first data entity, entity relationship information associated with the first data entity and additional data entities in the data store;

determine, by the data recommender service using a predictive model, a second priority rank for the additional data entities;

identify, based at least in part on the second priority rank, a related data entity of the additional data entities, the related data entity comprising additional data columns;

obtain, by the data profiling service, a third profile for at least one of the additional data columns; and store the third profile in the cache associated with the data profiling service.

13. The non-transitory computer-readable storage medium of claim 11, wherein obtaining the first profile causes the computing system to:

retrieve entity data from a data store of the computing system, the entity data corresponding to the plurality of data columns; and determine, using the entity data, first characteristics of the first data column.

14. The non-transitory computer-readable storage medium of claim 13, wherein obtaining the second profile causes the computing system to:

retrieve the entity data from the cache associated with the data profiling service; and determine, using the entity data, second characteristics of the second data column.

15. The method of claim 1, wherein determining the priority rank comprises:

obtaining the interaction information corresponding to previous selections of the plurality of data columns out of the interactive session; and computing, using a collaborative filtering predictive model and based at least in part on the interaction information, a prediction value for each of the plurality of data columns.

16. The method of claim 15, wherein the collaborative filtering predictive model comprises a machine learning model previously trained using training interaction information for user interactions with the data entity and additional data entities.

17. The distributed computing system of claim 7, wherein determining the priority rank causes the distributed computing system to:

obtain the interaction information corresponding to previous selections of the plurality of data columns out of the interactive session; and compute, using a collaborative filtering predictive model and based at least in part on the interaction information, a prediction value for each of the plurality of data columns.

18. The distributed computing system of claim 17, wherein the collaborative filtering predictive model comprises a machine learning model previously trained using training interaction information for user interactions with the data entity and additional data entities.

19. The non-transitory computer-readable storage medium of claim 11, wherein determining the priority rank comprises causes the distributed computing system to:

obtain the interaction information corresponding to previous selections of the plurality of data columns out of the interactive session; and compute, using a collaborative filtering predictive model and based at least in part on the interaction information, a prediction value for each of the plurality of data columns.

20. The non-transitory computer-readable storage medium of claim 19, wherein the collaborative filtering predictive model comprises a machine learning model previously trained using training interaction information for user interactions with the data entity and additional data entities.

* * * * *